(12) United States Patent
Kunimori et al.

(10) Patent No.: US 6,231,275 B1
(45) Date of Patent: May 15, 2001

(54) BALL NOSE END MILL

(75) Inventors: Nagatoshi Kunimori; Naohiro Nakamura, both of Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/393,486

(22) Filed: Sep. 10, 1999

(30) Foreign Application Priority Data

Sep. 11, 1998 (JP) .................................................. 10-257682
Aug. 9, 1999 (JP) .................................................. 11-224752

(51) Int. Cl.$^7$ ................................................... B23C 5/22
(52) U.S. Cl. ................................ 407/42; 407/54; 407/63; 407/65
(58) Field of Search ........................... 407/35, 40, 42, 407/54, 113, 114, 63, 65, 62

(56) References Cited

U.S. PATENT DOCUMENTS

| | | | |
|---|---|---|---|
| 5,108,234 | * | 4/1992 | Stojanovski .............................. 407/40 |
| 5,580,194 | * | 12/1996 | Satran et al. ........................... 407/40 |
| 5,632,576 | * | 5/1997 | Storch ..................................... 407/32 |
| 5,782,589 | * | 7/1998 | Cole ..................................... 407/33 X |
| 5,915,888 | * | 6/1999 | Minicozzi .............................. 407/54 |
| 5,971,671 | * | 10/1999 | Mina ..................................... 407/42 |

FOREIGN PATENT DOCUMENTS

| | | |
|---|---|---|
| 2082102 | 3/1982 | (GB) . |
| 64-1248 | 1/1989 | (JP) . |
| 08252714 | 10/1996 | (JP) . |
| 11-104913 | 4/1999 | (JP) . |

OTHER PUBLICATIONS

JIS Japanese Industrial Standard JIS B 0401—1986; UDC 621.753.1/.2; pp. 1 to 38.

* cited by examiner

Primary Examiner—Henry Tsai
(74) Attorney, Agent, or Firm—W. F. Fasse; W. G. Fasse (57) ABSTRACT

A ball nose end mill includes a holder body with a first half and a second half of a tip end thereof divided by a slot, a plate-shaped insert in the slot, a clamp screw with a screw shaft screwed into the second half and a screw head bearing against the first half, a tapered ring fitted around the screw shaft and seated in a tapered hole in the insert, and a spring between the screw head and the tapered ring pressing the ring against the insert. The insert is firmly pressed against the bottom of the slot, and the screw is frictionally secured.

13 Claims, 7 Drawing Sheets

BALL NOSE END MILL

BACKGROUND OF THE INVENTION

1. Field of the Invention

The present invention relates to a ball nose end mill, and more specifically, to an indexable type ball nose end mill used for high speed, high precision machining of ball groove of a uniform joint and the like.

2. Description of the Background Art

Conventionally, when high speed and high precision machining is required in cutting a ball groove, for example, a solid ball nose end mill in which a holder body and a cutting edge are integrated, or a tipped ball nose end mill in which a cutting edge is fixed on a holder body by brazing, for example, has been used. In such ball nose end mills, however, when the cutting speed is increased to improve cutting efficiency, wear or chipping of the cutting edge increases. Therefore, in the ball nose end mills described above, as the degree or amount of wear or chipping increases, it becomes necessary to regrind the cutting edge or to exchange the ball nose end mill body more frequently, resulting in low economical efficiency.

In view of the foregoing, an indexable type ball nose end mill has come to be widely used, in which an indexable insert having a cutting edge formed on an indexable plate-shaped insert is mounted. The indexable type ball nose end mill is used with the plate-shaped insert inserted into a slot at a tip end of the holder body. The plate-shaped insert is attached to the holder body by closing the slot by clamping force of one damp screw. More specifically, an end surface of the plate-shaped insert is brought into contact with a bottom surface of the slot, and the end surface of the plate-shaped insert is pressed to the bottom surface of the slot of the holder body, so that rotation of the plate-shaped insert is restricted, and the plate-shaped insert and the holder body are integrated.

More specifically, in the above described indexable type ball nose end mill, a central portion of the plate-shaped insert is fixed and pressed to the bottom surface of the slot using a clamp screw, so that the bottom surface of the slot and an end surface of the plate-shaped insert are brought into contact with each other, thereby securing the plate-shaped insert. Therefore, in order to maintain exact securing of the plate-shaped insert even when cutting force variation occurs periodically during cutting, it is necessary to improve the precision of screw-fixing by the clamp screw. With the improved clamping precision, a clamping force sufficient to maintain the friction force between the male screw thread on the clamp screw and the female screw thread on the holder body is ensured.

Figure 14:
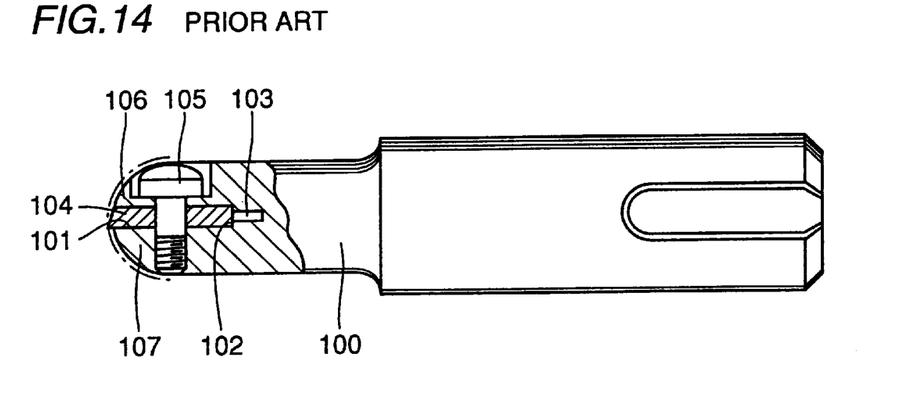
FIG. 14 is a cross sectional view of the conventional ball nose end mill viewed from a side surface of the slot.

For this purpose, various proposals related to the shapes of portions around the clamp screw have been made. In Japanese Patent Publication No. 64-1248, a slit is provided at the center of the bottom surface of the slot. FIG. 14 is a cross section of a ball nose end mill in accordance with this one example of the prior art in which a slot 101 of a holder body 100 is viewed from one side. The ball nose end mill having a slit 103 at the central portion of the bottom surface 102 of slot 101 has such a structure as described below, with reference to FIG. 14.

At the center of bottom surface 102 of slot 101 at the tip end of holder body 100, there is provided a slit 103. Plate-shaped insert 104 is inserted into slot 101. The space of slot 101 is made narrow by applying the clamping force of clamp screw 105, and a rear end surface of plate-shaped insert 104 is in contact with bottom surface 102 of slot 101. Therefore, in the conventional ball nose end mill having a slit a 103 provided at the central portion of the bottom surface 102 of slot 101, plate-shaped insert 104 is fixed in tight contact with bottom surface 102 of slot 101 of holder body 100 with its mechanical rotation suppressed.

In this prior art example, as slit 103 is provided at an equal distance from opposing side surfaces of slot 101, one half 106 and the other half 107 bend equally. Accordingly, plate-shaped insert 104 is fastened firmly, as it contacts the entire area of the side surfaces of the slot 101, that is, whole areas of the inner side surface of one half 106 and the side surface of the other half 107.

This prior art, however, has the following problem. Here, half 107 is inclined with respect to clamp screw 105 because of slit 103, and therefore accurate screw-fixing between the male screw portion of clamp screw 105 and female screw portion of half 107 is not attained. Further, by the method of clamping in which only the damp screw 105 is simply passed through a through hole, there remains a space between damp screw 105 and the through hole of plate-shaped insert 104, and therefore the plate-shaped insert 104 cannot be forced onto the bottom surface 102 of slot 101. As a result, restricting force is insufficient in the direction of extension of slot 101 and in the direction of rotation of damp screw 105, and therefore plate-shaped insert 104 may possibly be displaced when cutting force varies significantly.

Figure 15:
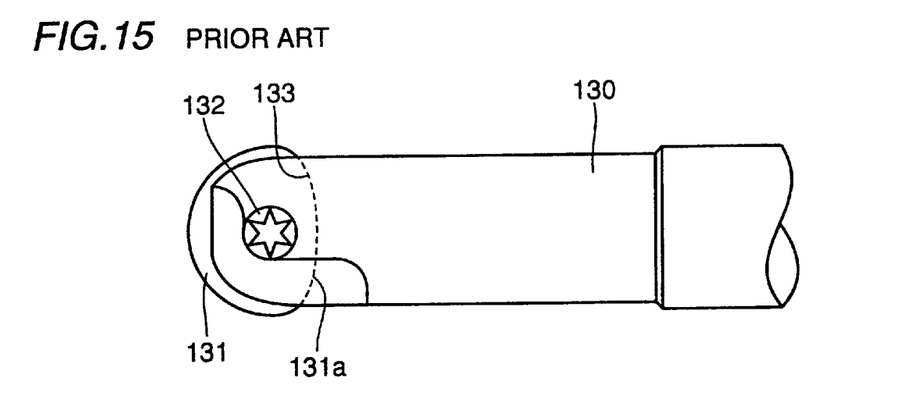
FIG. 15 is a plan view of the conventional ball nose end mill with a rear end surface of the plate-shaped insert formed arcuate.
Figure 16:
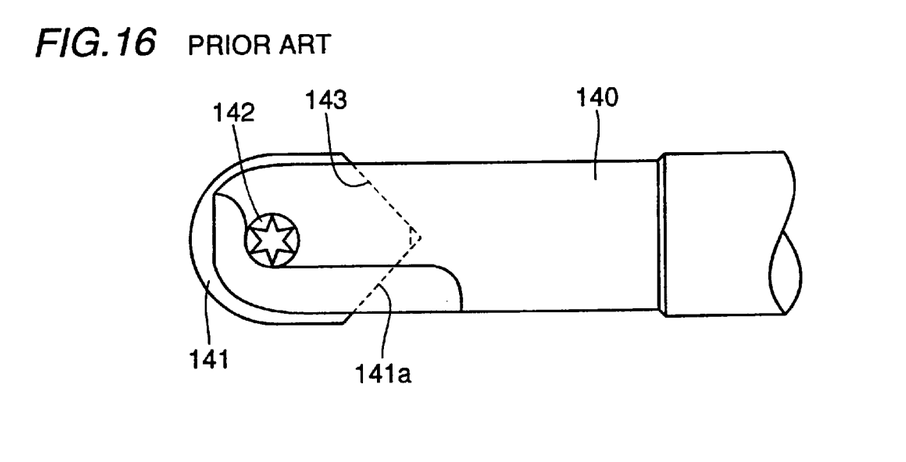
FIG. 16 is a plan view of the conventional ball nose end mill with the rear end portion of the plate-shaped insert formed in a V-shape.

Another ball nose end mill having a plate-shaped insert fixed therein is disclosed in Japanese Patent Laying-Open No. 8-252714. Two types of ball nose end mills disclosed in this laid-open application will be described with reference to FIGS. 15 and 16. FIG. 15 shows an example of the ball nose end mill having the plate-shaped insert with the rear end thereof formed in an arcuate shape, and FIG. 16 shows an example of a ball nose end mill having the plate-shaped insert with the rear end thereof formed in a V-shape.

First, the technical idea for fixing the plate-shaped insert of the ball nose end mill shown in FIG. 15 will be described. The plate-shaped insert 131 having a cutting edge is inserted in a slot traversing the central portion of the tip end of holder body 130 as shown in FIG. 15. Plate-shaped insert 131 is fastened as the width of the slot is narrowed by clamp screw 132.

At this time, when the rear end surface 131a of plate-shaped insert 131 is adapted to have the same radius of curvature as the bottom surface 133 of the slot, or when the radius of curvature of rear end surface 131a is made larger than that of bottom surface 133, plate-shaped insert 131 is automatically aligned with its center line moved to a position overlapping the center line of holder body 130. This significantly improves finishing accuracy of the cutting process.

In order to attain high accuracy of cutting process, however, it is necessary to improve fitting accuracy of the through hole of plate-shaped insert 131 and neck diameter of damp screw 132. In addition, the position accuracy of the screw hole of holder body 130 must also be improved. More specifically, rear end surface 131a of plate-shaped insert 131 and the arcuate contact surface of bottom surface 133 of the slot must be in contact entirely. Though it may be possible if actual parts are gauged in selective attachment, it is difficult to attain the expected accuracy when plate-shaped insert 104, holder body 130 and clamp screw 132 are assembled at random.

The technical idea for fixing the plate-shaped insert of the ball nose end mill shown in FIG. 16 will be described in the following. A plate-shaped insert 141 having a cutting edge is inserted into a slot traversing the central portion of the tip end of a holder body 140 in the similar manner as the ball nose end mill of FIG. 15, and fastened as the slot is closed by clamp screw 142 as can be seen from FIG. 16. A rear end surface 141a of a plate-shaped insert 141 is formed to have a V-shape, and a bottom surface 143 of the slot, which is formed to have a V-shape opposing that of the rear end surface 141a, abuts the rear end surface. Therefore, the center line of the plate-shaped insert 141 is automatically moved to a position overlapping the center line of holder body 140 and aligned.

If the accuracy of the V-shaped contact surfaces of plate-shaped insert 141 and bottom surface 143 varies, however, accuracy against run out of plate-shaped insert 141 is not ensured. In order to minimize the influence of run out in a random combination of plate-shaped insert 141 and holder body 140, it is effective to carry out grinding of both V-shaped contact surfaces, i.e. the rear end surface 141a of plate-shaped insert 141 and the bottom surface 143. In order to grind the bottom surface 143 of the slot, a grinding wheel of a very small diameter which can be accommodated within the slot is necessary. The grinding wheel of a small diameter, however, has a problem in its strength, and therefore highly accurate grinding is difficult.

In the cutting process using the conventional ball nose end mill described above in connection with FIGS. 14 to 16, vibration in cutting force caused by variation in the process margin of the material to be cut or by slight vibration of the cutting edge of the plate-shaped insert is unavoidable. In such a state, if plate-shaped insert 104, 131, 141, slot 101 for example, and clamp screw 105, 132, 142 are not in tight contact with each other, the prescribed friction force for holding cannot be generated between the male screw portion, i.e. the male screw thread, and the female screw portion, i.e. the female screw thread. Thus, plate-shaped insert 104, 131, 141, slot 101 for example and clamp screw 105, 132, 142 would not be clamped with appropriate preliminary pressure. As a result, the friction force for holding generated between the male screw portion and the female screw portion which is maintained by the tensile stress of clamp screw 105, 132, 142 in its axial direction may possibly be lost by the vibration caused by the variation of cutting force. As a result, the clamp screw may become loose.

In order to prevent loosening of the clamp screw, it is necessary to attain extremely highly accurate positioning in processing the through hole of the plate-shaped insert 104, 131, 141, the female screw of holder body 100, 130, 141 and the like. Improvement in processing accuracy of these portions requires very high cost, and is therefore not practical. Therefore, it is necessary to compensate for the insufficient process accuracy and position accuracy of these portions by an improvement of the clamping structure of the plate-shaped insert.

SUMMARY OF THE INVENTION

An object of the present invention is to provide a ball nose end mill having a damping structure which can prevent loosening of a clamp screw caused by variation in cutting force on the cutting edge.

The ball nose end mill in accordance with an aspect of the present invention includes a holder body having one half thereof (i.e. a "first half") and the other half thereof (i.e. a "second half") divided by a slot extending from a central portion of a tip end along the axial direction of the holder body, i.e. the direction parallel to the longitudinal axis of the holder body. Further, the ball nose end mill in accordance with an aspect of the present invention includes a plate-shaped insert having a through hole penetrating approximately the central portion of front and rear opposing main surfaces thereof and being inserted in the slot, and a clamp screw screwed through a hole provided in the aforementioned one half and the through hole into a female screw portion provided at the aforementioned other half, so that the plate-shaped insert is clamped with its front and rear main surfaces fastened between an inner side surface of the one half and an inner side surface of the other half. Further, the aforementioned one half includes a bore in which the head of the clamp screw is seated, as a part of the hole provided in the one half. The plate-shaped insert includes a tapered portion, which is a part of the through hole of the plate-shaped insert, having its diameter enlarged toward the one half. Further, the ball nose end mill in accordance with one aspect of the present invention includes a conical spring fitted on the underhead neck of the clamp screw seated in the bore and inserted into the hole provided in the one half, and a tapered ring provided below the conical spring and fitted in the through hole, having such a shape that corresponds to the shape of the tapered portion of the through hole.

In the ball nose end mill in accordance with the above described aspect, inner side surfaces of the insert front surface protrusion and the insert rear surface protrusion provided on the side surfaces of the plate-shaped insert are forced into the contact portions respectively, whereby displacement or deviation of the plate-shaped insert in the direction of extension of the slot can be prevented. Therefore, more secure fastening of the plate-shaped insert is possible. Further, as the inner side surfaces of the insert front surface protrusion and the insert rear surface protrusion are formed to be wider from the tip end of the cutting edge toward a surface to be opposite to the bottom surface of the slot, insertion of the plate-shaped insert is made smooth.

Preferably, the ball nose end mill in accordance with the aforementioned one and another aspects of the present invention is provided with a slit extending in a direction parallel to an inner side surface of the one half formed at a bottom surface of the slot at a position biased to the one half from the central position between the inner side surface of the one half and the inner side surface of the other half.

In such a structure, since the slit is biased or shifted toward the one half, the width of the other half in the direction perpendicular to the slot is widened at the portion where the slit is provided. Therefore, in a cross section perpendicular to the slit, the aforementioned other half comes to have a large second moment of inertia as a cantilever. Accordingly, the aforementioned other half as a cantilever comes to have a higher flexural rigidity. Therefore, as compared with the corresponding other half of the conventional ball nose end mill in which the slit is provided at the center between the one and the other halves, the aforementioned other half in accordance with the present invention bends less as a cantilever when the clamping force of the clamp screw, that is, bending stress is exerted thereon. Therefore, when the plate-shaped insert is to be fastened by closing the slot using the clamp screw with the central axis of the male screw portion of the clamp screw and the central axis of the female screw provided at the aforementioned other half being approximately aligned, displacement or misregistration of the central axis of the female screw from the central axis of the male screw caused by bending of the aforementioned other half can be suppressed. As a result, the female screw portion and the male screw portion are screw-fixed with approximately the exact accuracy as designed, and therefore the friction force reflecting the accuracy of the screw is generated between the male and female screw portions. Accordingly, loosening of the clamp screw caused by the run out derived from variation in cutting force can be suppressed.

The ball nose end mill in accordance with the above described one and another aspects may further include a plain washer fitted on the clamp screw, inserted between the underhead surface of the clamp screw and an upper surface of the bore.

As the plain washer is interposed in this structure, the damp screw is screwed in the holder body with the body and the neck guided, without impairing the screw accuracy of the screw portion.

In the ball nose end mill in accordance with the above described one and another aspects, the holder body may have a holder body blind hole formed approximately parallel to the clamp screw, from an outer side surface of the aforementioned other half to the central portion of the bottom surface of the slot. Further, the plate-shaped insert has an insert recess extending from a surface to be in contact with the aforementioned other half to a surface to be opposite to the bottom surface of the slot. The ball nose end mill may further include a pin inserted into the holder body blind hole to approximately the center of the slot and fitted in but not brought into contact with the insert recess.

Because of this structure, when the plate-shaped insert happens to be inserted upside down, the recess and the pin do not fit, and therefore, the plate-shaped insert cannot be fully inserted. Therefore, the through hole for receiving the clamp screw, the hole provided in the aforementioned one half and the female screw portion of the other half have central axes that are considerably displaced from each other, and therefore, the clamp screw cannot be screw-fixed. Therefore, erroneous fastening of the plate-shaped insert upside down can be prevented.

More preferably, the ball nose end mill in accordance with the above described one and another aspects has a chip pocket for accommodating hip from the bottom surface of the slot along the axial direction of the holder body, along the inner side surface of the aforementioned one half. Thus, cutting is possible without scattering the chips therearound.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described with reference to the figures.

First Embodiment

Figure 1:
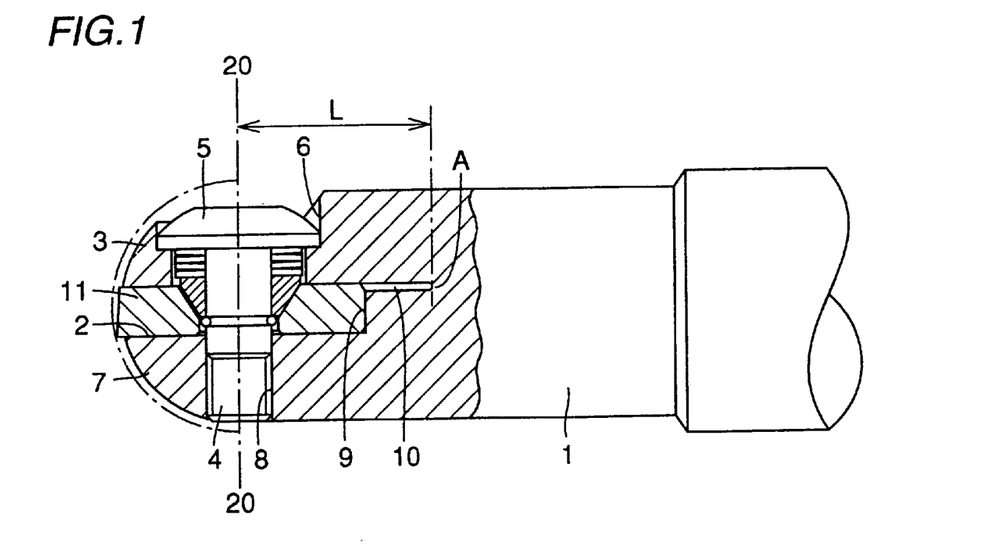
FIG. 1 is a cross sectional view of a portion of the slot in the ball nose end mill in accordance with a first embodiment of the present invention.

The ball nose end mill in accordance with the first embodiment of the present invention will be described with reference to FIGS. 1 to 4. FIG. 1 is cross sectional view showing, in enlargement, a portion around a slot 2 of a holder body 1 of the ball nose end mill in accordance with the present embodiment. As can be seen from FIG. 1, the ball nose end mill in accordance with the present embodiment has the following structure.

Holder body 1 has one half 3, i.e. a first half 3, and the other half 7, i.e. a second half 7, divided by a slot 2 extending from a central portion of the tip end along the axial direction of the holder body 1 extending parallel to the longitudinal axis thereof. The one half 3 has a bore 6 in which a head 5 of a clamp screw 4 is seated. The other half 7 has a female screw portion or thread 8 provided therein. At a bottom surface 9 of slot 2, a slit extending along an inner side surface of the one half 3 is provided at a position shifted or biased away from the axial center plane toward the one half 3. A plate-shaped insert 11 inserted into slot 2 is fastened on holder body 1 as the slot 2 is clamped in a direction so as to clamp together or narrow the width thereof by the clamping force of clamp screw 4.

When clamping force acts on a line 20—20 representing the central axis of clamp screw 4, one half 3 bends to make narrower the width of slot 2, as a cantilever with a point A at the bottom of slit 10 serving as a base point. Further, slit 10 is provided biased to one half 3. Therefore, width of the other half 7 in a direction vertical to slot 2 in the region where slit 10 is provided becomes larger relative to the width of one half 3 in the same direction.

When clamping force acts on a line 20—20 representing the central axis of clamp screw 4, the one half 3 bends to make narrower the width of slot 2, as a cantilever bending from a point A at the bottom of slit 10 serving as a base point. Further, slit 10 is provided at a location biased toward the one half 3. Therefore, the width of the other half 7 in a direction perpendicular to slot 2 in the region where slit 10 is provided becomes larger relative to the width of the one half 3 in the same direction.

Therefore, accordingly, the other half as a cantilever comes to have large second moment of inertia at the cross Accordingly, the other half 7 as cantilever comes to have higher flexural rigidity. Therefore, as compared with the other half 7 of conventional ball nose end mill in which slit 10 is provided at the center between one and the other halves 3 and 7, the other half 7 bends less when the clamping force of clamp screw 4, that is, bending stress, is exerted on the cantilever.

Therefore, when plate-shaped insert 11 is fastened by closing slot 2 by clamp screw 4 with the central axis 20—20 of the male screw portion provided on clamp screw 4 and the central axis of female screw portion 8 provided on the other half 7 being approximately aligned, deviation or displacement of the central axis of female screw portion 8 from the central axis 20—20 of male screw portion because of bend of the other half 7 can be suppressed. As a result, the male screw portion of the clamp screw 4 and female screw portion 8 of the other half 7 are screw-fixed with approximately the exact accuracy as designed, and therefore friction force for holding in accordance with the accuracy of the screw is generated between the male and female screw portions.

Generally, it is an established theory that loosening of a screw results when friction force generated between an inclined surface of the thread of the male portion and an inclined surface of the thread of the female portion which are in contact decreases. Assuming that this theory is correct, the structure of the ball nose end mill in accordance with the present embodiment ensures friction force reflecting the accuracy of the screw, and therefore loosening of the clamp screw caused by run out resulting from variation in cutting force can be suppressed.

Figure 2:
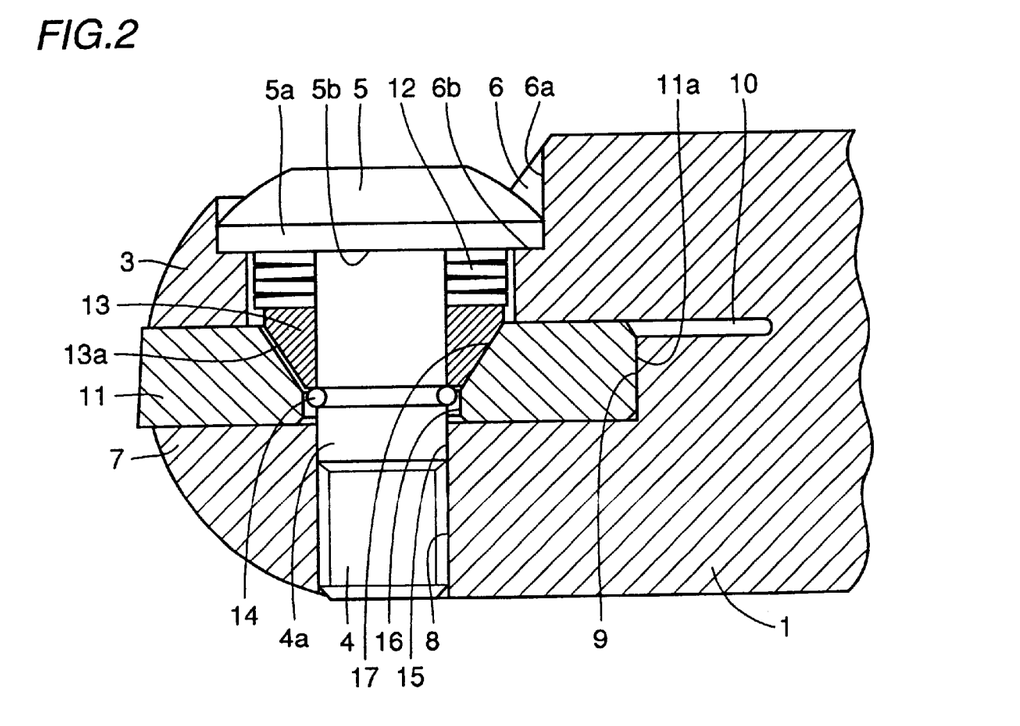
FIG. 2 is a cross sectional view of a portion near a clamp screw of the ball nose end mill in accordance with the first embodiment of the present invention.

The structure of the ball nose end mill in accordance with the present embodiment will be described in greater detail with reference to FIG. 2 showing, in further enlargement, a portion around clamp screw 4. As can be seen from FIG. 2, the ball nose end mill in accordance with the present embodiment has the following structure.

At underhead neck portion 5 of clamp screw 4, a conical spring 12 and a tapered ring 13 are rotatably fitted. Tapered ling 13 is fixed by a snap ring 14 so as not to be slipped off.

A side surface 5a of head portion 5 of clamp screw 4 and a wall surface 6a of bore 6 provided at one half 3 match with each other with such an accuracy as defined in "Dimensional Tolerance and Engagement" of JIS (Japanese Industrial Standard) B0401. More specifically, these are fitted with a space therebetween such that the diameter of the hole is slightly larger than the minimum tolerable dimension, or the diameter of the shaft is slightly smaller then the maximum tolerable dimension, including a case where the tolerance zone, that is, the difference between the minimum tolerable dimension and the maximum tolerable dimension is zero. Further, in the other half 7, a body portion 4a of clamp screw 4 and a guide portion 15 to which the body portion 4a is inserted match with each other with a space therebetween such that the diameter of the hole is slightly larger than the minimum tolerable dimension, or the diameter of the shaft is slightly smaller then the maximum tolerable dimension, including a case where tolerance zone is 0.

As the male screw portion of clamp screw 4 is screwed into the female screw portion 8 of the other half 7, a tapered portion 17 of through hole 16 of plate-shaped insert 11 comes to be in contact with an inclined surface 13a providing the taper of tapered ring 13 on the side of the bottom surface 9 of slot 2. Thus, plate-shaped insert 11 moves in such a direction that forces an end surface 11a of plate-shaped insert 11 to the bottom surface 9 of slot 2.

Figure 4A:
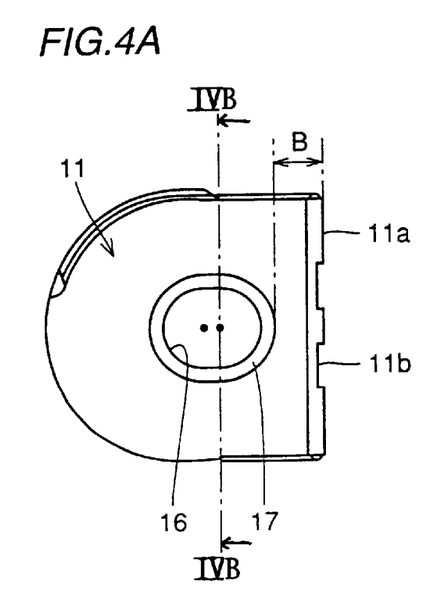
FIG. 4A is a plan view of the plate-shaped insert of the ball nose end mill in accordance with the first embodiment of the present invention.

In order to attain the function of moving plate-shaped insert 11 toward the bottom surface of slot 2, the central axis of through hole 16 is formed closer to the tip end side of the cutting edge than the central axis of tapered ring 13 to be fitted into the through hole 16. Accordingly, as can be seen from FIG. 2, it becomes possible to fasten plate-shaped insert 11 by damp screw 4 in such a state in that inclined surface 13a of tapered ring 13 is not in contact with tapered portion 17 of through hole 16 of plate-shaped insert 11 at the tip end side of the cutting edge, that is, in such a state that there is a space. Thus, plate-shaped insert 11 is free from any force forcing the insert toward the tip end of the cutting edge. In other words, plate-shaped insert 11 receives such a force that presses the insert only to the bottom surface 9 of slot 2 from tapered ring 13. Therefore, plate-shaped insert 11 is surely brought into tight contact with the bottom surface 9 of slot 2. Alternatively, in order to attain the above described function, through hole 16 of the plate-shaped insert may be formed as an elongate hole, elongate to the side of the tip end of the cutting edge in the axial direction of holder body, as shown in FIG. 4, which will be described later.

Further, when clamp screw 4 is fully screwed, underhead neck surface 5b of head 5 of clamp screw 4 abuts bore surface 6b of bore 6. At this time, recovering force of one half 3 to return the bend and recovering force of conical spring 12 to return the deformed state are determined. Thus, there is generated a resultant force of the recovering forces of one half 3 and the other half 7 as cantilevers acting with the point A formed by slit 10 being the base point and the recovering force of conical spring 12, pulling clamp screw 4 upward in the anal direction. The resultant force causes a prescribed friction force between the threads of the male screw portion of damp screw 4 and the threads of the female screw portion 8 of the other half 7. As the prescribed friction force is maintained, loosening of clamp screw 4 caused by variation of cutting force can be prevented. Thus, it becomes possible to firmly fasten plate-shaped insert 11 on holder body 1.

Further, as bore 6 of one half 3 and side surface 5a of the head of damp screw 4 as well as the guide portion 15 of the other half 7 and body portion 4a of clamp screw 4 are in tight matching, screw-fixing exactly corresponding to the accuracy of the screw can be attained by the clamp screw 4.

A structure of another ball nose end mill in accordance with the present embodiment adapted to prevent a not entire but local contact between the head 5 of clamp screw 4 and bore 6 will be described with reference to FIG. 3. The ball nose end mill in accordance with this aspect of the present embodiment has a plain washer 18 inserted between the neck of clamp screw 4 and conical spring 12. Except this point, the structure is the same as that of the ball nose end mill shown in FIG. 2.

Figure 3:
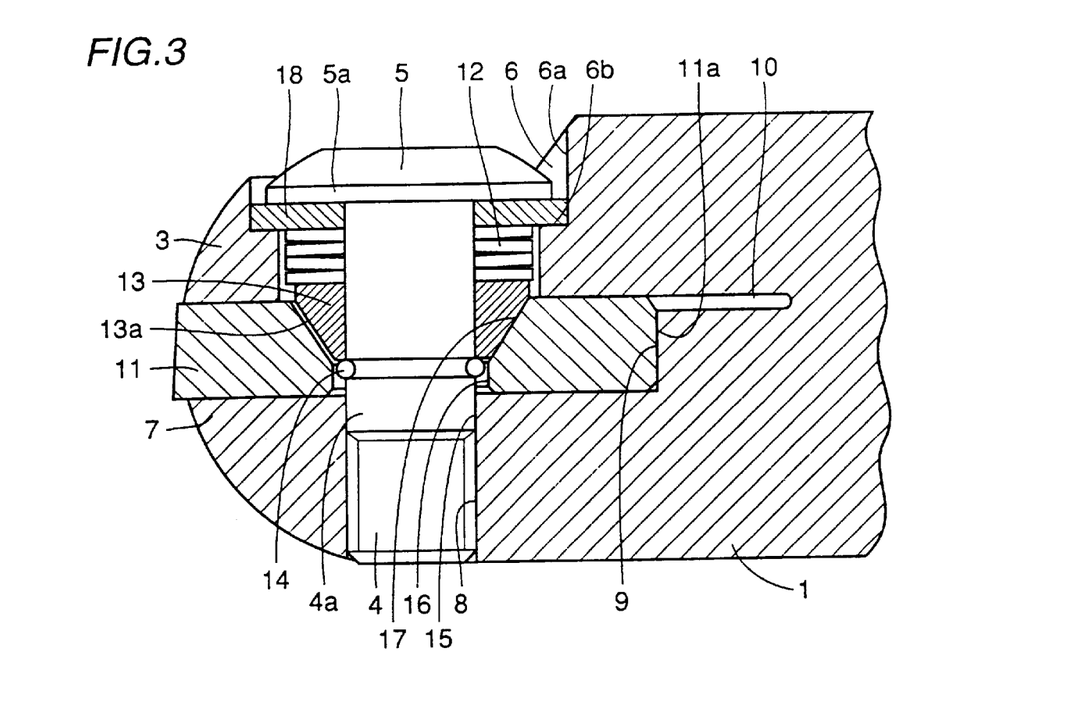
FIG. 3 is a cross sectional view representing a structure of means for preventing local abutting around the head of the clamp screw of the ball nose end mill in accordance with the present invention.

In the ball nose end mill shown in FIG. 3 of the present embodiment, bore 6 and the hole of the female screw portion 8 are processed by different cutting tools. Therefore, strictly speaking, the holes may not be concentrical circles. Therefore, in the structure of FIG. 2, when the guide portion 15 and screw portion and body portion 4a of damp screw 4 are used as reference, it may be possible in the initial stage of screw-fixing the damp screw 4, that bore 6 and the side surface 5a of the head 5 are brought into contact not on the entire contact surfaces but locally.

When there occurs a local contact deviated to the shank side of holder body 1, it is possible that screw-fixing between guide portion 15 and body portion 4a proceeds with clamp screw 4 inclined from the central axis of female screw 8. This promotes wear of the side surface 5a of the head 5.

This phenomenon can be avoided by interposing a plain washer 18 matching the diameter of the neck portion of clamp screw 4 and bore 6, between the neck of clamp screw 4 and conical spring 12. By the insertion of plain washer 18, it becomes possible that the male portion of the clamp screw 4 is screw-fixed in the female screw portion 8 guided by body portion 4a and the neck portion, without impairing the screw accuracy of the screw portion. This structure is also usable in the structure of the ball nose end mill in accordance with the second embodiment, which will be described later.

Figure 4B:
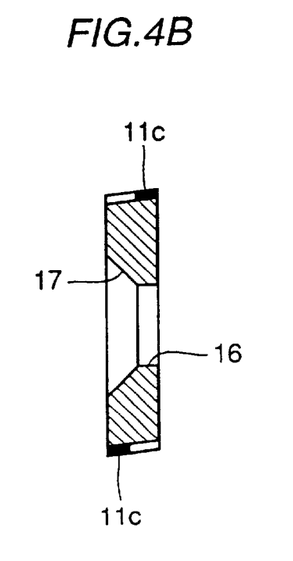
FIG. 4B is a cross sectional view of the plate-shaped insert of the ball nose end mill in accordance with the first embodiment of the present invention.

The structure of plate-shaped insert 11 will be described with reference to FIG. 4A and 4B. Planar appearance of plate-shaped insert 11 is as shown in FIG. 4A. The cross sectional structure along the line IB—IVB of FIG. 4A is as shown in FIG. 4B. Plate-shaped insert 11 shown in FIGS. 4A and 4B is formed of an alloy steel or a cemented carbide and has a uniform thickness. Through hole 16 is formed at the center of plate-shaped insert 11. Through hole 16 has a tapered portion 17 formed therein, which corresponds to the inclined surface 13a of the tapered ring 13. The through hole may be formed as an elongate hole elongate in the axial direction of holder body 1 so that plate-shaped insert 11 can move in the direction toward the bottom portion 9 of slot 2 when the tapered portion 17 of through hole 16 is forced by the inclined surface 13a of the tapered ring 13 receiving the recovering force of conical spring 12, and in that case also, the distance B between an end surface 11a of plate-shaped insert 11 and the periphery of the surface of through hole 16 is adjusted to be a prescribed dimension.

Further, recessed portion 11b on the side of rear end surface 11a should preferably be formed as a stable contact portion when plate-shaped insert 11 moves toward the bottom surface 9. A pair of cutting edges 11c form a part of an arch and they should preferably have a hard alloy or hard sintered body joined at the cutting edge portion so as to improve sharpness and wear resistance.

Second Embodiment

The ball nose end mill in accordance with the second embodiment of the present invention will be described with reference to FIGS. 5 to 13. The ball nose end mill of the present embodiment is similar in structure to the ball nose end mill of the first embodiment, and when hard texture locally exists in the composition of the cut material or when the shape is complicated and inevitably requiring interrupted cutting, the ball nose end mill of the present embodiment is capable of more securely fastening the plate-shaped insert on the holder body by restricting rotation of the plate-shaped insert around the clamp screw and by restricting movement of the insert in the direction of extension of the slot. The cross sectional structure of the ball nose end mill in accordance with the second embodiment is as shown in FIG. 5, which corresponds to FIG. 1 showing, in enlargement, the cross sectional structure around the slot 2 of the ball nose end mill in accordance with the first embodiment.

Figure 5:
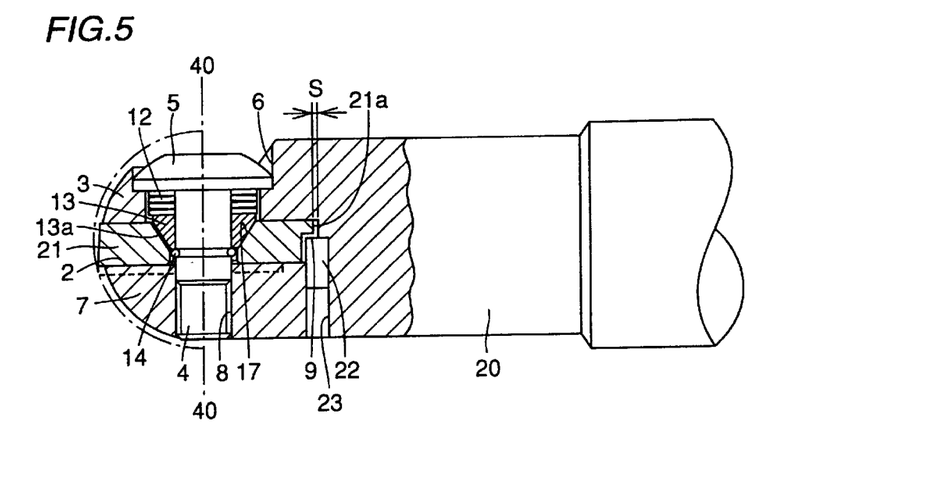
FIG. 5 is a cross sectional view of a portion near the slot of the ball nose end mill in accordance with a second embodiment of the present invention.

In the ball nose end mill in accordance with the present embodiment, as can be seen from FIG. 5, a bore 6 in which a head 5 of clamp screw 4 matches is provided in one half 3. The other half 7 has a female screw portion 8. At a neck of head 5 of clamp screw 4, a conical spring 12 and a tapered ring 13 are rotatively fitted, and fixed to prevent slipping, by snap ling 14.

Further, a holder body 20 has a holder body blind hole 23 formed approximately parallel to damp screw 4, extending from an outer side surface of the other half 7 to the center of the bottom surface of slot 2. A plate-shaped insert 21 has an insert recess 21d formed extending from a surface in contact with the other half 7 to a surface positioned on the side of the bottom surface of slot 2. A pin 22 is inserted to approximately the center of slot 2, in the holder body blind hole 23 so as to be fitted in but not in contact with the recess of insert recess 21d.

Figure 6A:
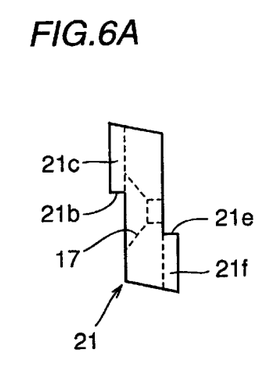
FIG. 6A is a front view of the plate-shaped insert of the ball nose end mill in accordance with the second embodiment of the present invention.
Figure 6B:
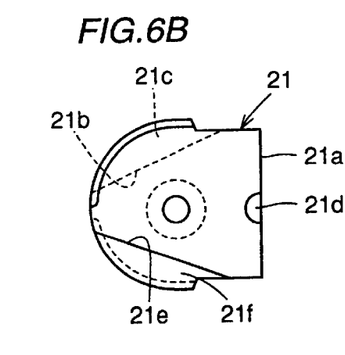
FIG. 6B is a plan view of the plate-shaped insert of the ball nose end mill in accordance with the second embodiment of the present invention.

In the ball nose end mill of the present embodiment, plate-shaped insert 21 has an insert front surface protrusion 21c extending from a tip end side to a side surface of a main rake face, and an insert rear surface protrusion 21f extending from a tip end to side surface of a sub rake face, when viewed from the flank, as shown in FIG. 6A. Further, an inner side surface 21b of insert front surface protrusion 21c and an inner side surface 21e of insert rear surface protrusion 21f are formed to have a taper widening from the tip end of the cutting edge to a rear end surface 21a to be opposite to the bottom portion of slot 2, when viewed from the side of the rake face, as shown in FIG. 6B. There is a space S between a rear end surface 21a of plate-shaped insert 21 and the bottom portion of slot 2.

Figure 7A:
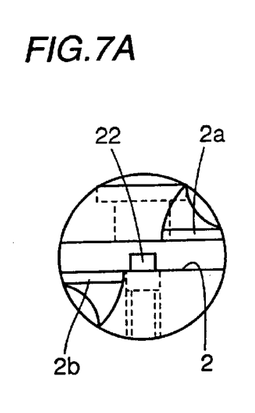
FIG. 7A is a front view of the holder body of the ball nose end mill in accordance with the second embodiment of the present invention.
Figure 7B:
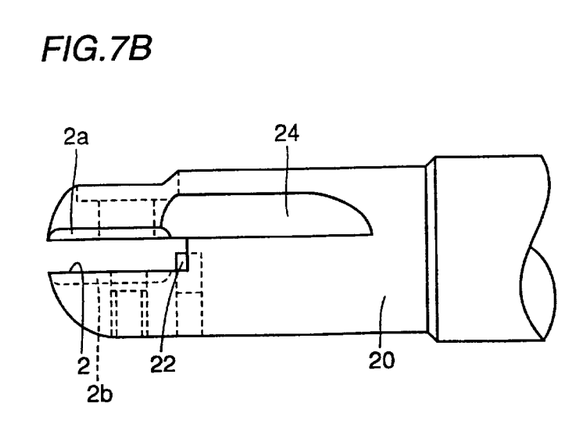
FIG. 7B is a side view of the holder body of the ball nose end mill in accordance with the second embodiment of the present invention.

The shape of slot 2 of holder body 20 into which plate-shaped insert 21 is inserted is as shown in FIGS. 7A and 7B. FIG. 7A is a front view of holder body 20, and FIG. 7B is a side view of holder body 20. Contact portions 2a, 2b located opposite the inner side surfaces 21b, 21e of protrusions 21c, 21f of main and sub rake faces of plate-shaped insert 21 are formed on inner side surfaces of slot 2. Movement of plate-shaped insert 21 is restricted by the contact portions 2a, 2b. Further, a chip pocket 24 for accommodating chips generated by cutting is formed along the inner side surface of one half 3, extending from the bottom surface 9 of slot 2 in the axial direction of holder body 20.

Referring to FIG. 5, as clamp screw 4 is screw-fixed in female screw portion 8 of the other half 7, plate-shaped insert 21 has the tapered portion 17 brought into contact with the inclined surface 13a of tapered ring 13 at the side of bottom surface 9 of slot 2. Thus plate-shaped insert 21 is forced to the bottom surface 9 of slot 2. By this movement of plate-shaped insert 21, the side surfaces 21b, 21e of protrusions 21c, 21f of the main and sub rake faces of plate-shaped insert 21 come to be strongly in contact with the contact portions 2a, 2b of slot 2 opposed thereto.

Thus, rotation around the lamp screw and movement in the direction of extension of the slot 2, of the plate-shaped insert 11 are restricted. Therefore, even when subjected to cutting force variation during interrupted cutting, for example, the friction force of clamp screw 4 is maintained stable, and therefore degradation of cutting force caused by chattering or the like of the cutting surface resulting from slight vibration of plate-shaped insert 21 can be prevented. As a result, compared with the ball nose end mill in accordance of the first embodiment, the plate-shaped insert 21 is more securely fixed on holder body 20 in the ball nose end mill of the second embodiment, and therefore slit 10 may be unnecessary.

In the ball nose end mill in accordance with the present embodiment, the inner side surfaces 21b, 21e of the main or sub rake face protrusions 21c, 21f of plate-shaped insert 21 and the contact portions 2a, 2b of the slot 2 are formed of planes which can be exposed externally. Therefore, as compared with the V-shaped bottom portion 143 which is deep, grinding with high accuracy is possible.

Further, as shown in FIG. 5, holder body 20 has holder body blind hole 23 formed approximately parallel to damp screw 4, from the outer side surface of the other half 7 to the center of the bottom surface 9 of slot 2. Plate-shaped insert 21 has an insert recess 21d extending from a surface to be in contact with the other half 7 to a surface to be opposite to the bottom surface 9 of slot 2. Further, pin 22 is inserted to approximately the center of slot 2 through holder body blind hole 23. The pin 22 is engaged with insert recess 21d and fixes plate-shaped insert 21. In this manner, by the use of pin 22, careless mistake in inserting the plate-shaped insert 21 can be prevented. More specifically, in such a structure as described above, even when the plate-shaped insert 21 is to be inserted to holder body 20 upside down, that is, reverse to the direction shown in FIG. 5, screw-fixing by damp screw 4 is not possible. Therefore, erroneous insertion of plate-shaped insert 21 upside down can be prevented.

In order to prevent such an error, a female screw may be provided at the tip end of holder body blind hole 23, and a screw plug may be screwed in, instead of pin 22. This structure is also applicable to ball nose end mill of the first embodiment.

Figure 8:
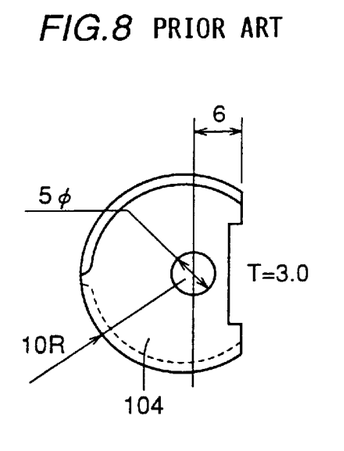
FIG. 8 represents shape and dimension of a plate-shaped insert of a comparative example.

The prior art as a comparative example using a plate-shaped insert 104 shown in FIG. 8 in a ball nose end mill holder body shown in FIG. 14 and the ball nose end mill in accordance with the present embodiment will be compared, noting the loosening preventing structure, and dimensional accuracy of components such as the plate-shaped insert and the holder body.

Plate-shaped insert 104 of the comparative example is formed to have the thickness of 3.0 mm to be matching the slot 101 having the width of 3 mm, as shown in FIG. 8. The material of plate-shaped insert 104 is cemented carbide, with cBN (Cubic Boron Nitride), which is a hard sintered body, brazed and integrated on an arcuate cutting edge portion.

Figure 9:
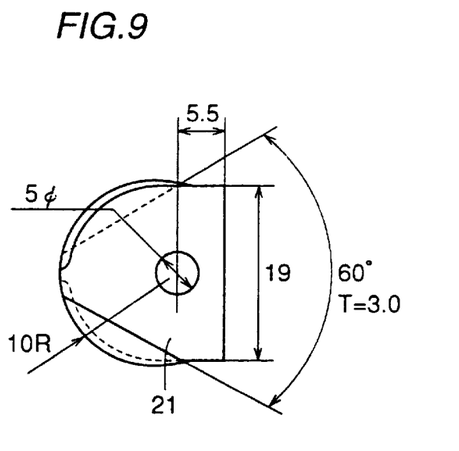
FIG. 9 represents shape and dimension of a plate-shaped insert in accordance with a second embodiment.

The thickness and the material of plate-shaped insert 21 in accordance with the present embodiment are the same as those of the comparative example. Five samples of the plate-shaped insert in accordance with the present embodiment and five samples of the plate-shaped insert of the comparative example are prepared, each being finished to satisfy the 7th grade accuracy in accordance with JIS0401 of radius of curvature, thickness and the like. SNCM (Nickel Chromium Molybdenum Steels) 630 is selected as the material of holder body 100 and holder body 20, and one shank formed to have an outer diameter of 20 mm is prepared for each sample.

Figure 11:
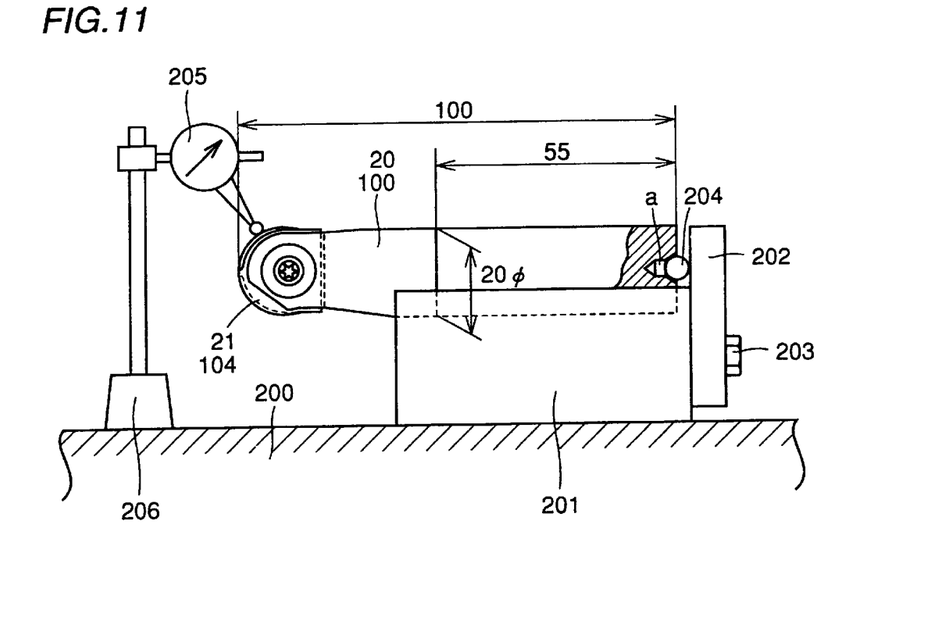
FIG. 11 is a schematic diagram of an equipment used for measuring accuracy against run out.

An equipment for measuring accuracy against run out of the plate-shaped insert of the ball nose end mill will be briefly described. On a surface table 200, a V block 201 is placed. In a V-shaped groove of V block 201, holder bodies 20 and 100 are successively mounted sideways. At a rear end of V block 201, a stopper 202 is fixed by a bolt. Holder bodies 20 and 100 are pressed to be in point contact on stopper 202 by means of a steel ball 204 embedded in a center hole a. A dial gauge 205 is attached on a magnet stand 206 which is fixed by attraction on surface table 200. A terminal of dial gauge 205 is in contact with one arcuate cutting edge of plate-shaped inserts 21 and 104.

In measuring accuracy against run out, first, holder body 20 or 100 is pushed to be in contact with stopper 202 with steel ball 204 interposed, and the measurement of dial gauge 205 is set to 0. Thereafter, holder body 20 or 100 is rotated by 180° C. about the central axis of holder body 20 or 100, so that the other arcuate cutting edge of plate-shaped insert 21 or 104 is brought into contact with the terminal of dial gauge 205. In this manner, the difference between the value of dial gauge 205 when one cutting edge is in contact with the terminal of dial gauge 205 and the value of dial gauge 205 when the other cutting edge is in contact with the terminal of dial gauge 205 is recorded as "run out".

Using such a measuring equipment as shown in FIG. 11, accuracy against run out of the ball nose end mills in accordance with the present embodiment and of the comparative example was measured. Accuracy against run out of five samples of the plate-shaped insert 104 of the ball nose end mill in accordance with the comparative example and five samples of the plate-shaped-insert 21 of the ball nose end mill in accordance with the present embodiment exhibited such values as shown in the upper and lower portions of FIG. 10.

Figure 12:
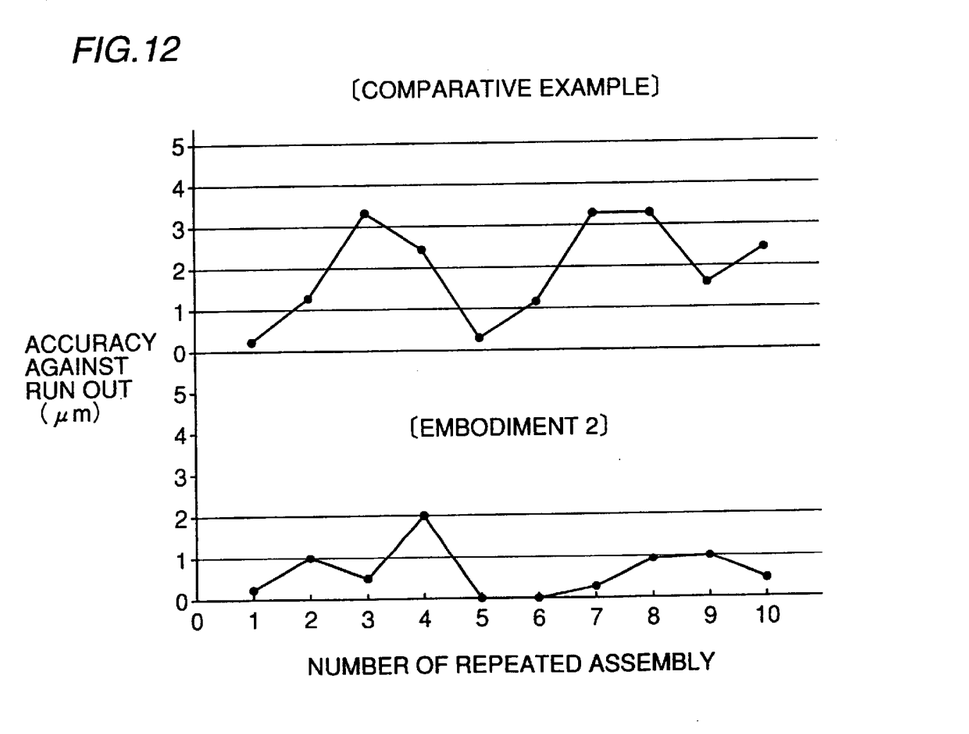
FIG. 12 is a graph representing result of comparison between accuracy against run out of the plate-shaped insert of Comparative example 2 and the plate-shaped insert in accordance with the second embodiment of the present invention, when the tips are subjected to repeated assembly.

Further, reproductivity of accuracy in assembling, that is, accuracy of assembly when the plate-shaped insert is attached and detached repeatedly for a number of times was evaluated, of which result is as shown in FIG. 12. The upper portion of this figure represents accuracy against run out after each use of the ball nose end mill in accordance with the comparative example, when assembly, that is, attachment and detachment of plate-shaped insert was repeated ten times, specifically mating components of holder body 100 and plate-shaped insert 104. The lower portion of the figure represents accuracy against run out after each use of the ball nose end mill in accordance with the present invention when the plate-shaped insert was attached and detached repeatedly for ten times, specifying mating components of holder body 20 and plate-shaped insert 21.

Figure 10:
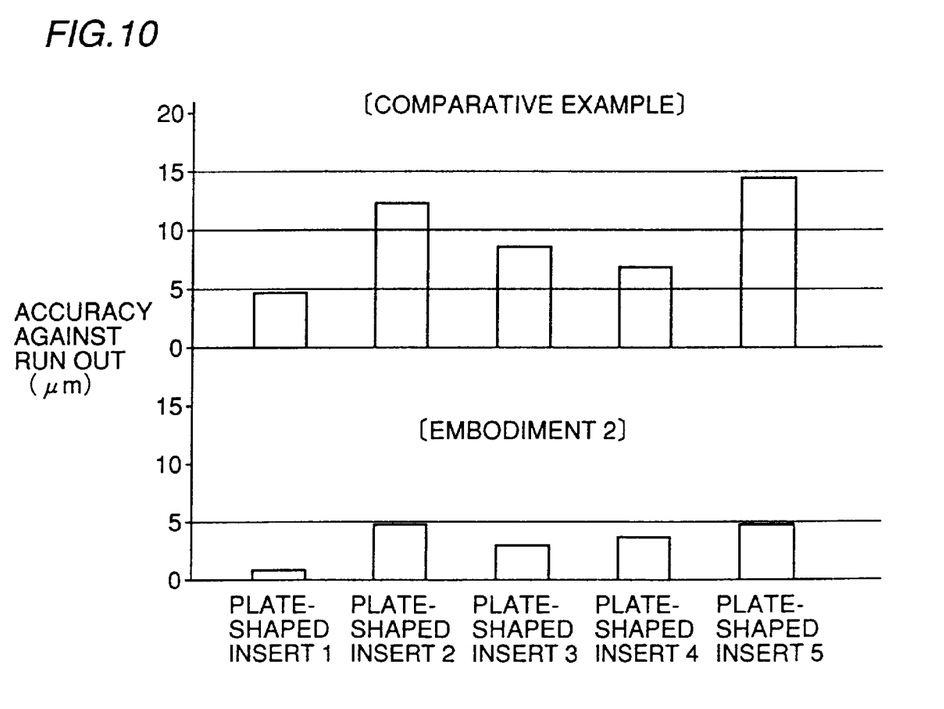
FIG. 10 is a graph representing result of comparison between accuracy against run out of the plate-shaped insert of Comparative example 2 and the plate-shaped insert in accordance with the second embodiment of the present invention.

As can be seen from the results represented by the graphs of FIGS. 10 and 12, the present invention is superior to the comparative example in accuracy against run out. The underlying principle is as follows.

In the comparative example, when the rear end surface of plate-shaped insert 104 and the bottom surface 102 of slot 101 are not in satisfactory full contact, which contact depends on fitting accuracy of the neck diameter of clamp screw 105 and through hole of plate-shaped insert 104 and position accuracy of the screw hole of holder body 100, the plate-shaped insert rotates around the clamp screw and moves in the direction of extension of the slot, because of cutting force. In the present embodiment, however, positioning with respect to the holder body is mainly defined by the inner side surfaces 21b, 21e of the protrusions 21c, 21f of the front and rear rake faces of plate-shaped insert 21 and the contact portions 2a, 2b of slot 2. Therefore, rotation around the clamp screw and movement in the direction of extension of the slot of plate-shaped insert can be restricted. Further, as a clamping structure incorporating a conical spring 12 and a tapered ling 13 is utilized, the plate-shaped insert 21 is strongly pressed against the bottom surface 9 of slot 2. As a result, in the ball nose end mill in accordance with the present embodiment, even when the contact surface of the thread cannot be sufficiently secured because of insufficient dimensional accuracy of the screw portion or the like, the plate-shaped insert 21 can be more fastened on holder body 20.

Figure 13:
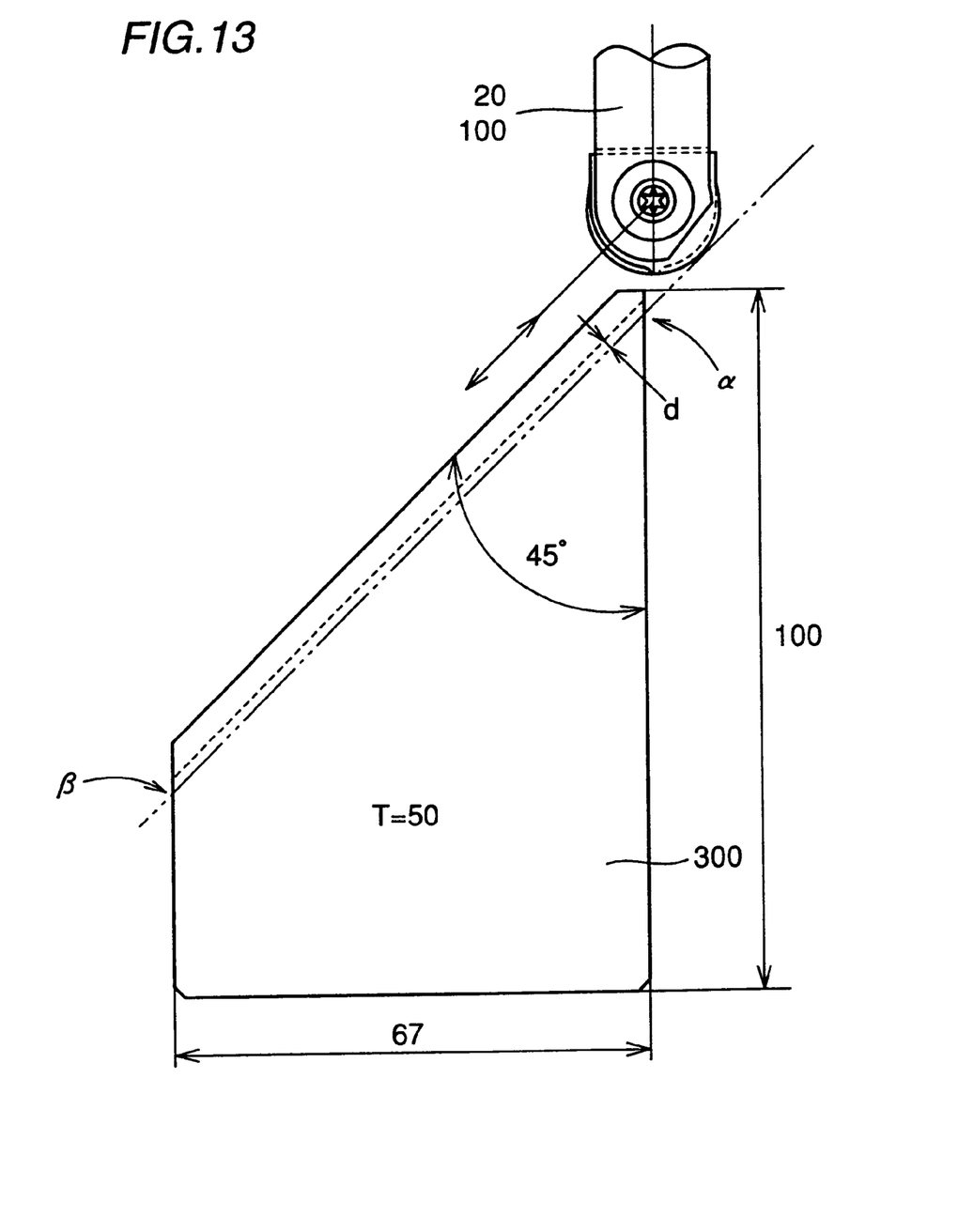
FIG. 13 represents shape and dimension of the work material.

The foregoing is directed to evaluation of statistic assembly accuracy. Evaluation of finishing surface roughness when the plate-shaped insert is under cutting force will be described As samples of the comparative example, one holder body 100 and two plate-shaped inserts 104 prepared for evaluating accuracy against run out were used. As samples of the present embodiment, one holder body 20 and two plate-shaped inserts 21 prepared for evaluating accuracy against run out were used. As a cutting material, a block material 300 formed of SCM (Chromium Molybdenum Steels) 415 case hardened/cemented to attain the hardness HRC (Hardness Rockwell C Scale) 60 was prepared as shown in FIG. 13. Under following cutting condition, the holder bodies 20 and 100 were linearly moved in a diagonal direction of 45° C. in dry atmosphere, as shown in FIG. 13: number of rotation N=10,000 rpm, cutting speed V=650 m/min, feed rate F=650 mm/min and depth of cut d=0.2 mm. At this time, finished surface roughness after the samples were reciprocated for 10 passes, with one pass being from α to β, was as shown in Table 1.

TABLE 1

|  | Finished Surface Roughness Rz (µm) |
|---|---|
| Comparative Example | |
| Sample 1 | 2.04 |
| Sample 2 | 1.97 |
| Second Embodiment | |
| Sample 3 | 1.46 |
| Sample 4 | 1.41 |

From the results of Table 1, it can be understood that the ball nose end mill in accordance with the present embodiment provides stable cutting surface roughness of the cutting material, as compared with the comparative example even under the same cutting condition, as the pressing force of tapered ring 13 generated by the recovering force of conical spring 12 provided to prevent loosening of clamp screw 4 in the present embodiment serves as a pressing force between the contact portions 2a, 2b of slot 2 and the inner side surfaces 21b, 21e of protrusions 21c, 21f of front and rear rake faces of plate-shaped insert 21, so that the plate-shaped insert 21 is fastened on holder body 20 even during cutting.

Although the present invention has been described and illustrated in detail, it is dearly understood that the same is by way of illustration and example only and is not to be taken by way of limitation, the spirit and scope of the present invention being limited only by the terms of the appended claims.

What is claimed is:

1. A ball nose end mill comprising:
a holder body that has a tool tip end, extends longitudinally in an axial direction, and includes a first half member and a second half member divided by a slot therebetween at said tool tip end and extending along said axial direction, wherein a first hole is provided through said first half member and a screw head seating surface surrounds said first hole on said first half member, said first half member has a first inner side surface bounding said slot, said second half member has a second inner side surface bounding said slot and facing toward said first inner side surface, and a threaded hole having a female screw threading therein is provided in said second half member;

a plate-shaped insert that has front and rear main surfaces with a through hole penetrating through said insert from said front main surface to said rear main surface, and is arranged in said slot with said front and rear main surfaces respectively contacted by said first and second inner side surfaces, wherein said through hole includes a tapered hole as at least a portion of said through hole adjoining said front main surface and tapering to a relatively reduced diameter toward said rear main surface;

a clamp screw including a screw shaft that extends through said first hole and said through hole and is thread-engaged in said female screw threading of said threaded hole, and a screw head that is connected to said screw shaft and that bears against said screw head seating surface so as to clamp together said first half member and said second half member with said first and second inner side surfaces pressed against said front and rear main surfaces respectively;

a tapered ring that is fitted around said screw shaft, has a tapered surface with a tapered shape corresponding to said tapered hole, and is received in said tapered hole; and a spring that is fitted around said screw shaft between said screw head and said tapered ring and that presses said tapered surface of said tapered ring against said plate-shaped insert in said tapered hole.

2. The ball nose end mill according to claim 1, wherein said slot extends along a central longitudinal plane of said holder body in said axial direction, said through hole penetrates through said insert approximately at a center of said front main surface and said rear main surface, said first hole includes a narrower passage hole through which said screw shaft extends and a wider head recess hole having a bottom rim formed by said screw head seating surface around said passage hole, and said spring is a conical spring.

3. The ball nose end mill according to claim 1, wherein said holder body further has therein a slit extending from a bottom of said slot between said first and second half members, and said slit extends in a direction parallel to said first inner side surface at a location offset closer to said first inner side surface and farther from said second inner side surface.

4. The ball nose end mill according to claim 1, further comprising a plain washer fitted around said screw shaft between said screw head and said screw head seating surface.

5. The ball nose end mill according to claim 1, wherein said holder body further has therein a pin receiving hole extending through said second half member from an outer surface of said holder body and opening into said slot;
said insert further has an end surface extending between said front and rear main surfaces adjacent to a bottom of said slot between said first and second inner side surfaces, and an insert recess extending from said rear main surface along said end surface; and said ball nose end mill further comprises a pin that is inserted into said pin receiving hole and that protrudes into said slot to be received in said insert recess without contacting said insert.

6. The ball nose end mill according to claim 1, wherein said slot has a bottom extending between said first and second inner side surfaces, wherein said holder body further has a chip pocket extending along an outer surface thereof parallel to said axial direction from said bottom of said slot along said first inner side surface.

7. The ball nose end mill according to claim 1, wherein:
said plate-shaped insert has a form of a plate, with said front and rear main surfaces respectively forming front and rear rake faces, and further having an insert tip end surface forming a flank face positioned at and exposed from said tool tip end of said holder body and an insert rear end surface opposite said tip end surface;
said plate-shaped insert further has a front protrusion on and protruding from said front rake face relatively closer to a first side edge of said insert and adjacent to and extending from said flank face, and a rear protrusion on and protruding from said rear rake face relatively closer to a second side edge of said insert, which is opposite said first side edge, and adjacent to and extending from said flank face;
said front protrusion is bounded by a front protrusion inner side surface extending out from said front rake face, said rear protrusion is bounded by a rear protrusion inner side surface extending out from said rear rake face, and said front protrusion inner side surface and said rear protrusion inner side surface are oriented relative to each other so as to form thereof a tapered configuration that is narrower toward said tip end surface and wider toward said rear end surface when viewed in a direction perpendicular to said rake faces; and
said first and second inner side surfaces of said holder body bounding said slot respectively have a first recessed portion and a second recessed portion that respectively fittingly contact said front protrusion inner side surface and said rear protrusion inner side surface.

8. The ball nose end mill according to claim 7, wherein said slot extends along a central longitudinal plane of said holder body in said axial direction, said through hole penetrates through said insert approximately at a center of said front main surface and said rear main surface, said first hole includes a narrower passage hole through which said screw shaft extends and a wider head recess hole having a bottom rim formed by said screw head seating surface around said passage hole, and said spring is a conical spring.

9. The ball nose end mill according to claim 7, wherein said holder body further has therein a slit extending from a bottom of said slot between said first and second half members, and said slit extends in a direction parallel to said first inner side surface at a location offset closer to said first inner side surface and farther from said second inner side surface.

10. The ball nose end mill according to claim 7, further comprising a plain washer fitted around said screw shaft between said screw head and said screw head seating surface.

11. The ball nose end mill according to claim 7, wherein said holder body further has therein a pin receiving hole extending through said second half member from an outer surface of said holder body and opening into said slot;
said insert further has an end surface extending between said front and rear main surfaces adjacent to a bottom of said slot between said first and second inner side surfaces, and an insert recess extending from said rear main surface along said end surface; and
said ball nose end mill further comprises a pin that is inserted into said pin receiving hole and that protrudes into said slot to be received in said insert recess without contacting said insert.

12. The ball nose end mill according to claim 7, wherein said slot has a bottom extending between said first and second inner side surfaces, wherein said holder body further has a chip pocket extending along an outer surface thereof parallel to said axial direction from said bottom of said slot along said first inner side surface.

13. A ball nose end mill comprising:
a holder body having one half and another half divided by a slot extending from a central portion of a tip end of said holder body along an axial direction;
a plate-shaped insert that has a through-hole penetrating approximately a center of front and rear main surfaces of said insert, and that is inserted into said slot;
a clamp screw including a head and a shaft screwed through a hole provided in said one half and said through hole into a female screw threading provided in said another half, for clamping said plate-shaped insert, by fastening said front and rear main surfaces respectively by an inner side surface of said one half and an inner side surface of said another half;
a bore on which said head of said clamp screw is seated, as part of said hole provided in said one half;
a tapered hole portion having a diameter thereof enlarged toward said one half, as a part of said through hole of said plate-shaped insert;
a conical spring fitted on said shaft of said clamp screw seated in said bore and inserted into said hole provided in said another half; and
a tapered ring provided below said conical spring and fitted in said through hole, having a tapered portion with a shape corresponding to said tapered hole portion of said through hole.

* * * * *

UNITED STATES PATENT AND TRADEMARK OFFICE
CERTIFICATE OF CORRECTION

PATENT NO. : 6,231,275 B1
DATED : May 15, 2001
INVENTOR(S) : Kunimori et al.

It is certified that error appears in the above-identified patent and that said Letters Patent is hereby corrected as shown below:

Column 1,
Line 31, after "one", replace "damp" by -- clamp --;

Column 4,
Between lines 24 and 25, insert the following paragraphs:
Because of this structure, as the clamp screw is gradually screwed, the conical spring is compressed. By the recovery force of the compressed conical spring, the tapered ring is pressed toward the through hole of the plate-shaped insert. At this time, the tapered portion of the through hole in the plate-shaped insert abuts the inclined surface providing the taper of the tapered ring. Accordingly, the plate-shaped insert moves in a direction such that a rear end surface of the plate-shaped insert is forced toward the bottom surface of the slot. As a result, the plate-shaped insert is more securely fixed on the holder body.

According to another aspect of the present invention, the ball nose end mill includes a holder body having one half thereof (i.e. a "first half") and the other half thereof (i.e. a "second half") divided by a slot extending from the central portion of a tip end along the axial direction of the holder body, i.e. the direction parallel to the longitudinal axis of the holder body, a plate-shaped insert having the shape of a plate having front and rear surfaces as rake faces and a tip end surface as a flank, and having a through hole penetrating through approximately the center of the rake faces and being inserted into the slot with the flank positioned at the tip end of the holder body, and a clamp screw screwed through a hole provided in the aforementioned one half and through the through hole into a female screw portion provided in the aforementioned other half for clamping the plate-shaped insert with the front and rear rake faces fastened between the respective inner side surfaces of the one half and the other half. Further, the plate-shaped insert has an insert front surface protrusion near one side end close to the flank on the front rake face and an insert rear surface protrusion near the other side end close to the flank on the rear rake face. An inner side surface of the insert front surface protrusion and an inner side surface of the insert rear surface protrusion are so formed as to provide a tapered portion extending to be wider from the tip end to the rear end of the plate-shaped insert when viewed from a direction perpendicular to the rake faces. Further, the slot of the holder body has a holder contact portion fitting the inner side surface of the insert front surface protrusion and the inner side surface of the insert rear surface protrusion.

UNITED STATES PATENT AND TRADEMARK OFFICE
CERTIFICATE OF CORRECTION

PATENT NO. : 6,231,275 B1
DATED : May 15, 2001
INVENTOR(S) : Kunimori et al.

It is certified that error appears in the above-identified patent and that said Letters Patent is hereby corrected as shown below:

Column 5,
Lines 38 to 43, replace these lines to read as follows:
More preferably, the ball nose end mill in accordance with the above described one and another aspects has a chip pocket for accommodating chips. The chip pocket extends from the bottom surface of the slot along the axial direction of the holder body, along the inner side surface of the aforementioned one half. Thus, cutting is possible without scattering the chips therearound.

Column 6,
Line 54, after "is", insert -- a --;

Column 7,
Lines 7 to 14, delete these entire lines.
Lines 24 to 32, replace these lines to read as follows:
Therefore, accordingly, the other half 7 as a cantilever comes to have larger second moment of inertia at the cross section vertical, i.e. perpendicular, to slit 10. Accordingly, the other half 7 as a cantilever comes to have higher flexural rigidity. Therefore, as compared with the other half 7 of the conventional ball nose end mill in which slit 10 is provided at the center between one and the other halves 3 and 7, the other half 7 bends less when the clamping force of clamp screw 4, that is, bending stress, is exerted on the cantilever.

Column 8,
Line 30, after "by", replace "damp" by -- clamp --;
Line 55, after "the", replace "anal" by -- axial --;
Line 64, before "screw", replace "damp" by -- clamp --;

Column 9,
Line 38, after "line", replace "IB-IVB" by -- IVB-IVB --;
Line 51, after "an", replace "and" by -- end --;

Column 10,
Line 20, after "snap" replace "ling" by -- ring --;
Line 22, before "screw", replace "damp" by -- clamp --;

UNITED STATES PATENT AND TRADEMARK OFFICE
CERTIFICATE OF CORRECTION

PATENT NO. : 6,231,275 B1
DATED : May 15, 2001
INVENTOR(S) : Kunimori et al.

It is certified that error appears in the above-identified patent and that said Letters Patent is hereby corrected as shown below:

Column 11,
Line 1, before "screw", replace "lamp" by -- clamp --;
Line 22, after "to", replace "damp" by -- clamp --;
Line 35, after "by", replace "damp" by -- clamp --;

Column 13,
Line 15, after "described", insert -- . --.

Signed and Sealed this

Fourth Day of June, 2002

*Attest:*

JAMES E. ROGAN
*Director of the United States Patent and Trademark Office*

*Attesting Officer*